United States Patent
Barkus

[11] Patent Number: 5,835,653
[45] Date of Patent: Nov. 10, 1998

[54] TERMINATION ASSEMBLY FOR AN OPTICAL FIBER CABLE

[75] Inventor: Lee Andrew Barkus, Millersburg, Pa.

[73] Assignee: The Whitaker Corporation, Wilmington, Del.

[21] Appl. No.: 903,845

[22] Filed: Jul. 31, 1997

Related U.S. Application Data

[60] Provisional application No. 60/029,227, Oct. 20, 1996.

[51] Int. Cl.$^6$ ..................................................... G02B 6/36
[52] U.S. Cl. ................................. 385/87; 385/86; 385/81
[58] Field of Search .................................. 385/87, 81, 76, 385/86, 56

[56] References Cited

U.S. PATENT DOCUMENTS

| | | | |
|---|---|---|---|
| 4,435,038 | 3/1984 | Soes et al. | 350/96.21 |
| 5,202,942 | 4/1993 | Collins et al. | 385/87 |

*Primary Examiner*—Phan T. H. Palmer
*Attorney, Agent, or Firm*—Gerald K. Kita

[57] ABSTRACT

An optical fiber termination assembly (1) in which a jacket (24) of an optical fiber cable (20) is clamped between a termination member (10) and an inner crimp eyelet (41), and a unitary deformable body (48) within an interior of the eyelet (41), deformable thin wall sections (50) optical fibers (21, 22), and the eyelet (41) being crimped inwardly to close the deformable thin wall sections (50) in frictional contact with the optical fibers (21, 22).

7 Claims, 3 Drawing Sheets

TERMINATION ASSEMBLY FOR AN OPTICAL FIBER CABLE

CROSS REFERENCE TO RELATED APPLICATION

This application claims the benefit of Provisional Application No. 60/029,227, filed Oct. 20, 1996.

FIELD OF THE INVENTION

The invention relates to a termination assembly, more particularly, an optical fiber cable termination assembly.

BACKGROUND OF THE INVENTION

A known optical fiber termination assembly for connection to an optical fiber cable is disclosed in U.S. Pat. No. 5,202,942. An inner crimp eyelet within the cable is between a jacket of the cable and at least one optical fiber of the cable. The jacket of the cable extends between the eyelet and a termination member that surrounds the cable. At least one crimp ring surrounds the termination member. The crimp ring is inwardly crimped while over the termination member, whereby, the jacket becomes clamped between the termination member and the eyelet.

According to the known optical fiber termination assembly, the eyelet allows movement of the optical fiber. Such movement of the optical fiber within the termination assembly can be identified as a failure mode, for example, a failure mode causing potential source of optical signal loss, particularly at an end face of the optical fiber when optically coupled with another optical device such as another end face of another optical fiber.

It would be desirable for the eyelet to restrain movement of any optical fiber within the eyelet, while distributing stress on the optical fiber and avoiding locations of concentrated stress on the optical fiber. Further it would be desirable for the eyelet to restrain movement of the optical fiber by frictional restraint on the optical fiber instead of high crimping pressure on the optical fiber.

SUMMARY OF THE INVENTION

According to the invention, an optical fiber termination assembly comprises, a jacket of an optical cable clamped between a termination member and an inner crimp eyelet, and further comprises, a unitary deformable body within an interior of the eyelet, the unitary deformable body having unitary deformable thin wall sections facing axial passageways along which optical fibers extend, and the eyelet being crimped inwardly to close the deformable thin wall sections in frictional contact with the optical fibers to restrain the optical fibers from movement. An advantage resides in the thin wall sections engaging the optical fibers with frictional restraint instead of by high crimping pressure that would tend to crush the optical fibers. The frictional restraint is particularly effective for restraining buffered optical fibers, wherein, a buffer coating on each of the optical fibers is soft and susceptible to being crushed when subjected to high crimping pressure.

DESCRIPTION OF THE DRAWINGS

Embodiments of the invention will now be described by way of example with reference to the accompanying drawings, according to which.

DETAILED DESCRIPTION

Figure 1:
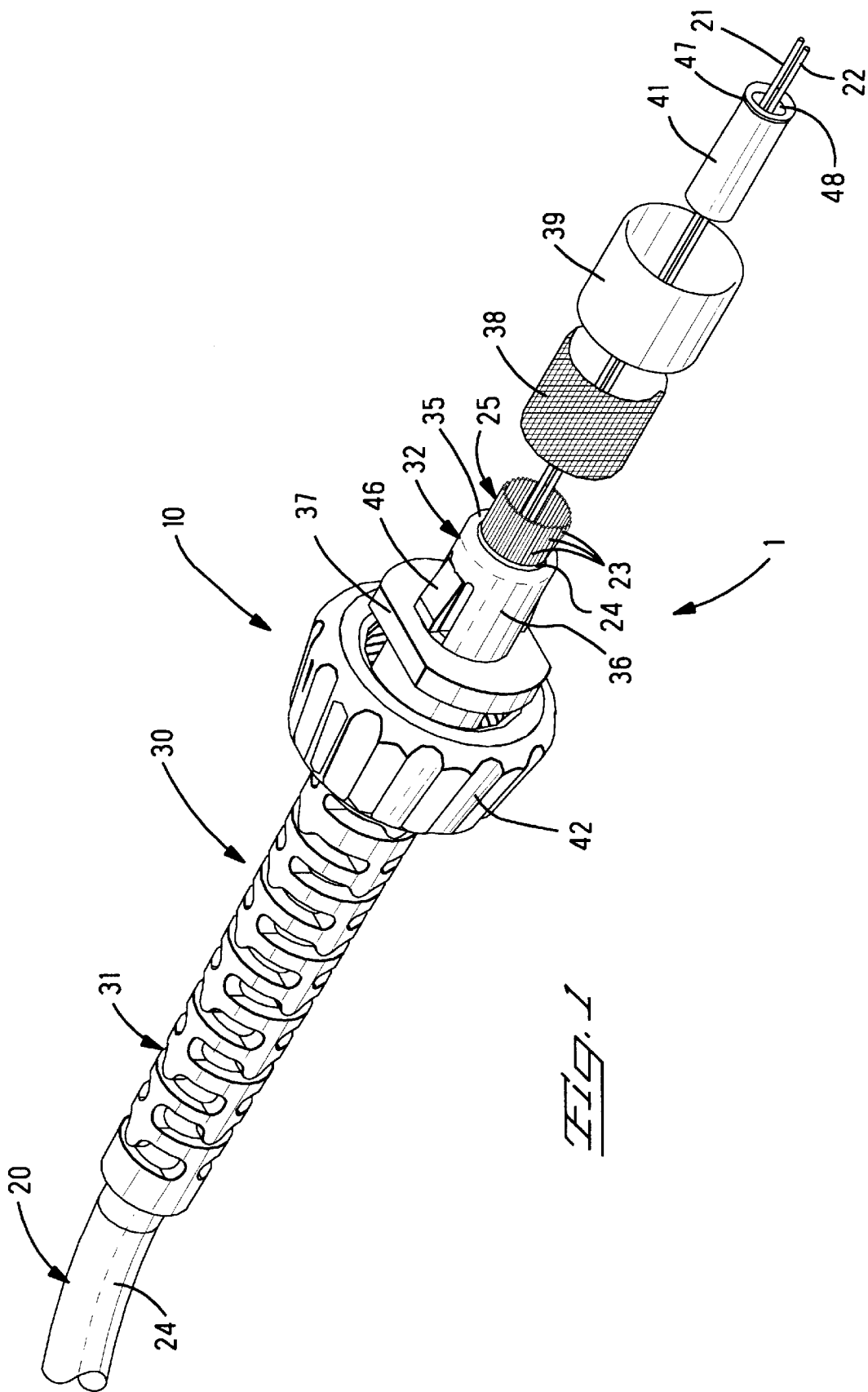
FIG. 1 is an isometric view of an optical fiber termination assembly with parts separated from one another, together with an optical fiber cable.
Figure 2:
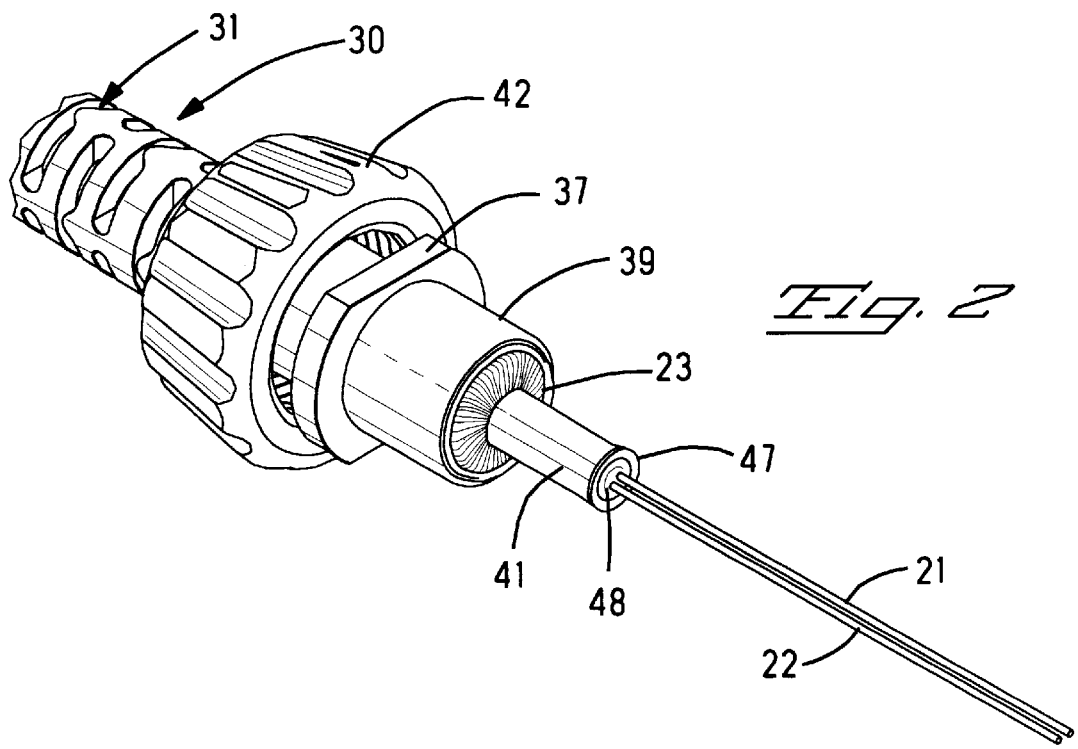
FIG. 2 is an isometric view of the device as shown in FIG. 1, illustrating some of the parts assembled together.
Figure 3:
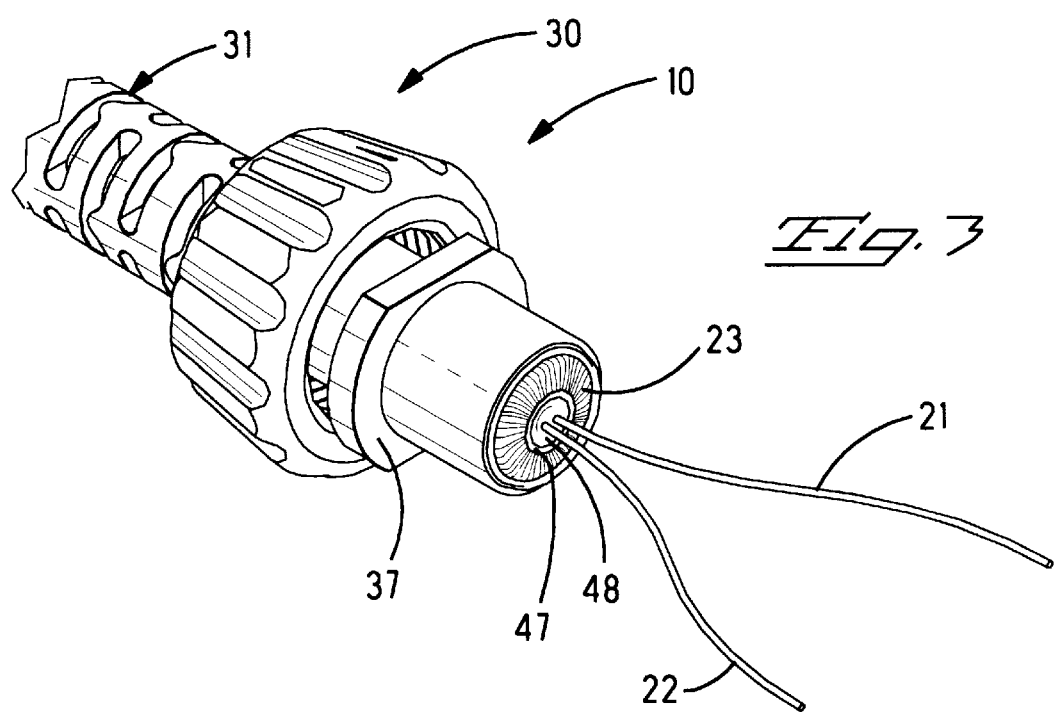
FIG. 3 is an isometric view similar to FIG. 2 with the parts of the termination assembly assembled together.

With reference to FIGS. 1–3, a cable termination member 10 and optical fiber cable 20 are shown. The termination member 10 comprises a part of an optical fiber termination assembly 1 for connection to the cable 20. Further details of the optical fiber termination assembly 1 will be described hereafter, and additional associated details are disclosed in U.S. Pat. No. 5,202,942, incorporated herein by reference.

FIGS. 1–4 illustrate an optical fiber cable termination member 10 and an optical fiber cable 20 terminated thereby. Cable termination member 10 comprises a portion of an optical fiber termination assembly 1, which is adapted to be connected to a complementary connector to mate optical fibers in cable 20 to optical fibers of a cable attached to the complementary connector.

Optical fiber cable 20 comprises a pair of optical fiber members 21 and 22 generally centrally within the cable, although the invention is not limited to a cable carrying any particular number of optical fiber members. Optical fiber members 21 and 22 typically comprise individual optical fibers covered by a buffer layer, and are referred to as buffer covered fibers or buffered fibers.

Cable 20 further includes a load bearing portion 25 which preferably comprises a plurality elongated strength members 23 of braided Kevlar fiber or the like that extend lengthwise of the cable and that are distributed over and substantially surround the optical fiber members 21 and 22. In addition, the cable 20 includes a flexible outer jacket 24 of polymeric material which encloses and surrounds the elongated strength members 23.

The cable termination member 10 comprises a generally tubular-shaped cable termination body 30, forward of transverse flange 37, having a central bore 33 for receiving an end of the optical fiber cable 20. Body 30 includes an elongated, flexible strain-relief body portion 31 extending rearwardly and encircling the cable 20 and a relatively rigid tubular-shaped crimp body portion 32. The optical fiber connector 1 further includes an inner crimp ring or eyelet 41.

With reference to FIGS. 4–7, the eyelet 41 comprises a soft metal such as brass or copper of a thickness that is capable of being inwardly deformed by relatively high crimping pressure exerted radially inward on the eyelet 41. A unitary deformable body 48 within the interior of the eyelet 41 has axial passageways 49 along which the optical fibers 21, 22 slidably extend prior to said crimping, the unitary deformable body 48 having unitary, deformable, thin wall sections 50 that comprise, and operate as, pairs of deformable hinge flanges 50 on opposite sides of the axial passageways 49. For example, the deformable hinge flanges 50 are arranged in pairs, with each pair being spaced apart by a gap 51. The deformable hinge flanges 50 of each pair are cupped toward each other to provide a pocket facing the circumference of a corresponding optical fiber 21, 22.

Figure 7:
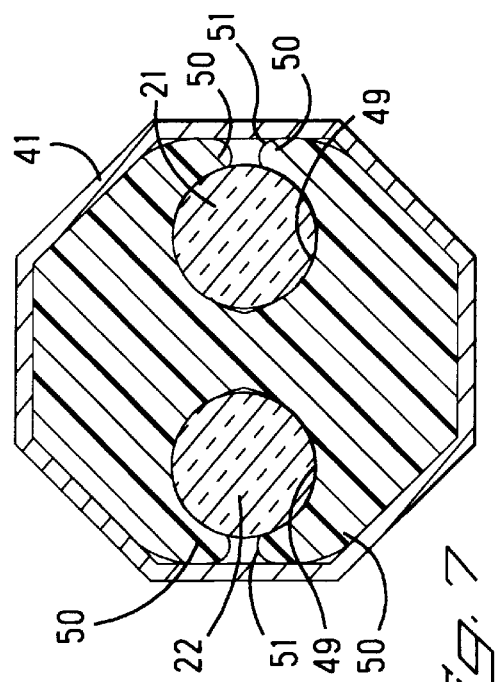
FIG. 7 is an view similar to FIG. 6 of the eyelet after crimping.
Figure 5:
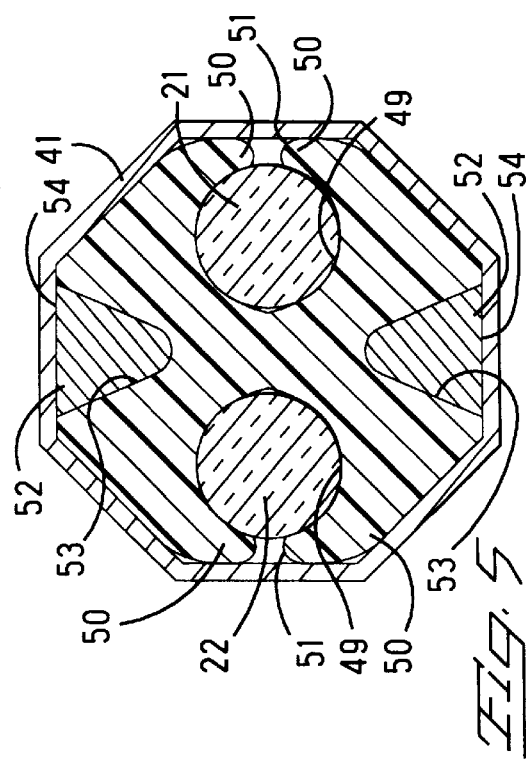
FIG. 5 is an view similar to FIG. 4 of the eyelet after crimping.

With reference to FIG. 2, the eyelet 41 is positioned prior to crimping, as shown, surrounding the optical fibers 21, 22 where they project from the crimp body portion 32 and the crimp ring 39. With reference to FIGS. 5 and 7, the eyelet 41 is shown as having been crimped inwardly to close the deformable hinge flanges 50 in frictional contact with the optical fibers 21, 22 to restrain the optical fibers 21, 22 from movement. The exterior of the eyelet 41 is deformed, for example, into a hexagonal cross section by having been crimped inwardly. However, the shape of the cross section and the extent of deformation is exaggerated, for purposes of illustration.

With reference to FIG. 3, after crimping of the eyelet 41, the eyelet 41 and the gripped portions of the optical fibers 21, 22 are inserted into the crimp body portion 32 and within the jacket 24 of the cable 20. The optical fibers 21, 22 will be retracted into the jacket 24 of the cable to lie within the jacket 24 with some amount of slack. Since the length of the eyelet 41 is small, about 0.350 inch, the amount of retraction is nearly as small, which causes a small amount of slack.

An advantage resides in frictional restraint of the optical fibers 21, 22 instead of by high crimping pressure that would tend to crush the optical fibers 21, 22. The frictional restraint is particularly effective for buffered optical fibers, wherein, a buffer coating on each of the optical fibers is soft and susceptible to being crushed by high crimping pressure.

Figure 6:
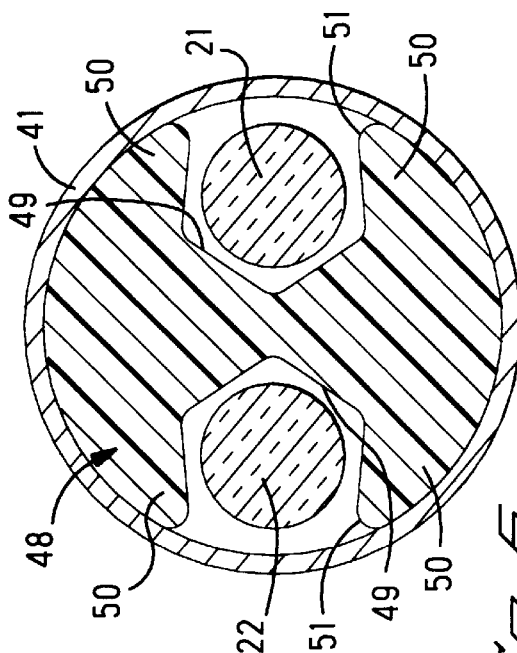
FIG. 6 is an end view of another inner termination eyelet of the optical termination assembly prior to crimping.
Figure 4:
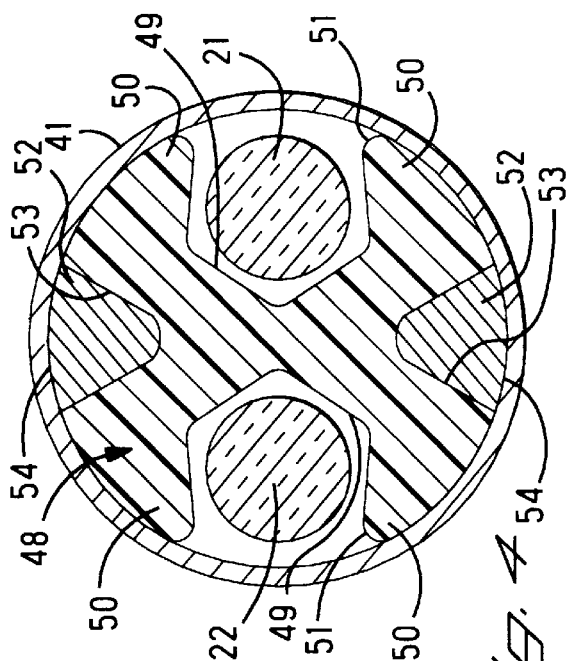
FIG. 4 is an end view of an inner termination eyelet of the optical termination assembly prior to crimping.

With reference to FIGS. 4 and 6, the eyelet 41, prior to crimping, has a cylindrical interior that faces an exterior of the unitary deformable body 48. For example, such surfaces are of complementary shape. The unitary deformable body 48 is manufactured, for example, as an extrusion of 40 durometer rubber or molded silicone having a measurement reading of 40 on a durometer measurement instrument, and having a cross section shaped as shown in FIGS. 4 or 7. With reference to FIGS. 4 and 5, at least one spine 52 of rigid material, comprising, a relatively incompressible rubber or metal, for example, is inset within a corresponding groove 53 in the exterior of the unitary deformable body 48. For example, the unitary deformable body 48 can be manufactured together with each spine 52 by coextrusion. Each spine 52 is more rigid than the deformable body 48. Each spine 52 serves as a stiffener for the deformable body 48, and maintains axial alignment of the thin wall sections 50 and the passageways 49, especially during crimping. An exterior surface 54 on each spine 52 faces the complementary shaped interior of the eyelet 41. The eyelet 41 is crimped to engage the exterior surface of each spine 52, forcing each wedge shaped spine 52 radially inward of the unitary deformable body 48, and wedging away the hinge flanges 50 causing them to pivot.

The inward crimping of the eyelet 41 circumferentially closes on the deformable body 48. Such crimping causes the exterior of the deformable body 48 to be deformed circumferentially toward the optical fibers 21, 22 that are along the passageways 49 to circumferentially narrow all of the passageways 49 inwardly in circumferential gripping restraint against respective optical fibers 21, 22 to restrain movement of the optical fibers 21, 22. Since the hinge flanges 50 are separated by a gap 51, the unitary hinge flanges 50 of each pair can pivot, by deformation of the unitary deformable body 48, toward each other to narrow the gap 51 and to close the hinge flanges 50 against a corresponding optical fiber 21, 22. Thus, inward crimping pressure on the eyelet 41 causes pivoting of the hinge flanges 50 instead of crushing of the hinge flanges 50 against the optical fibers 21, 22. The hinge flanges 50 pivot to substantially surround and engage the optical fibers 21, 22. Crimping causes the cupped shapes of the hinge flanges 50 to pivot against the optical fibers 21, 22 without exerting high crimping pressure, the pivoted hinge flanges 50 restraining the optical fibers 21, 22 by frictional restraint instead of by high crimping pressure. The rubber or the silicone has a coefficient of friction that provides gripping by frictional restraint when the hinge flanges 50 are pivoted toward each other to substantially surround and engage the optical fibers 21, 22. According to an advantage of the invention, crimping pressure causes the hinge flanges 50 to close on the optical fibers 21, 22 by pivoting, instead of by crushing the hinge flanges 50 with high crimping pressure against the optical fibers 21, 22.

With reference in particular to FIGS. 1–2, the procedure for attaching optical fiber cable termination member 10, to an optical fiber cable 20 will now be described. After being extended into and through bore 33 of termination body 30, cable 20 is prepared by cutting away a portion of cable jacket 24 to expose a length of the elongated strength members 23 and the buffered fibers 21 and 22 to extend from the end of the jacket 24. The end of the jacket is substantially aligned with the outer end 35 of the crimp body portion 32 of the cable termination body such that the exposed lengths of optical fiber members and strength members extend outwardly beyond the end 35 of crimp body portion 32.

The first outer crimp ring 38, which preferably comprises a substantially rigid ring of brass or the like, is positioned around the outer surface 36 of the tubular-shaped crimp body portion 32, and the strength members 23 are then fanned out and folded rearwardly over the outer surface of the first outer crimp ring 38. The second outer crimp ring 39, which is preferably formed of copper, is then positioned around the first outer crimp ring and over the fanned out strength members such that the strength members are positioned between the first and second outer crimp rings as shown in FIG. 2.

Thereafter, the inner crimp eyelet 41 is positioned around the exposed optical fiber members 21 and 22 and inserted into the end of the cable such that it is positioned between the optical fiber members 21,22 and the strength members 23, and within the first and second outer crimp rings.

The second outer crimp ring 39 is then crimped to the first outer crimp ring 38 with a conventional crimping tool to deform the second outer crimp ring inwardly against the strength members therebetween to firmly anchor the strength members to the cable termination member as shown in FIG. 3. As shown in FIG. 1, the outer surface of the first outer crimp ring 38 is preferably knurled or otherwise roughened to improve retention of the strength members 23 between the outer crimp rings 38,39.

The inner crimp eyelet 41 of the present invention provides a compressed body within the optical fiber cable which cooperates with the inner surface of the tubular-shaped crimp body portion 32 of cable termination body 30 to firmly secure the cable jacket 24 therebetween.

The tubular-shaped crimp body portion 32 of cable termination body 30 is formed with a pair of diametrically opposed, flexible finger elements 46, as shown in FIG. 1, which are pushed inwardly against the cable jacket 24 when the outer crimp rings 38,39 are crimped to further secure the flexible jacket to the termination member.

With the inner crimp eyelet 41 of the present invention, the outer jacket 24 of the cable 20 is reliably retained within the termination member against a pulling force against the cable of up to 25 to 30 pounds; whereas, without the inner crimp eyelet, a pulling force of as little as six to ten pounds was often sufficient to cause the jacket 24 to loosen or be pulled free of the termination member.

The inner crimp eyelet 41 also functions as a backing for the first and second outer crimp rings 38,39 when they are crimped together with the strength members 23 therebetween. This permits the outer crimp rings 38,39 to be crimped together more tightly and to thus more securely anchor the strength members 23 therebetween. More particularly, the inner crimp eyelet 41 helps protect the buffered optical fibers 20,21 from being bent or otherwise damaged during the crimping process thus permitting a stronger crimping force to be applied.

Although preferred embodiments of the invention have been disclosed, other embodiments and modifications are intended to be covered by the spirit and scope of the appended claims.

What is claimed is:

1. An optical fiber termination assembly comprises, a jacket of an optical cable clamped between a termination member and an inner crimp eyelet, and further comprises, a unitary deformable body within an interior of the eyelet, the unitary deformable body having unitary deformable thin wall sections facing axial passageways along which optical fibers extend, and the eyelet being crimped inwardly to close the deformable thin wall sections in frictional contact with the optical fibers to restrain the optical fibers from movement.

2. An optical fiber termination assembly as recited in claim 1 wherein, the thin wall sections are pivoted to close in frictional engagement with the optical fibers instead of being crushed against the optical fibers.

3. An optical fiber termination assembly as recited in claim 1 wherein, the thin wall sections are arranged in pairs, with each pair being spaced apart by a gap, and the thin wall sections pivot to narrow the gaps and to close in frictional engagement with the optical fibers.

4. An optical fiber termination assembly as recited in claim 1 wherein, the thin wall sections are separated by gaps, and the thin wall sections pivot to narrow the gaps and to close in frictional engagement with the optical fibers.

5. An optical fiber termination assembly as recited in claim 1 wherein, the thin wall sections are cupped to provide pockets for the optical fibers.

6. An optical fiber termination assembly as recited in claim 1 wherein, the thin wall sections are in pairs, and the thin wall sections of each pair are cupped toward each other to provide a pocket facing the circumference of a corresponding optical fiber.

7. An optical fiber termination assembly as recited in claim 1 and further comprising: at least one spine inset within an exterior of the unitary deformable body, said spine having an exterior surface facing an interior of the eyelet.

* * * * *